United States Patent [19]

Nowlin et al.

[11] 4,332,685

[45] Jun. 1, 1982

[54] METHOD AND APPARATUS FOR TREATING WATER

[75] Inventors: Duane D. Nowlin, New Brighton; Dennis G. Winberg, Cottage Grove, both of Minn.

[73] Assignee: Ecodyne Corporation, Chicago, Ill.

[21] Appl. No.: 872,540

[22] Filed: Jan. 26, 1978

[51] Int. Cl.³ .............................................. B01D 13/00
[52] U.S. Cl. ................................. 210/638; 210/257.2; 210/321.1; 210/433.2
[58] Field of Search .................... 210/22, 23 H, 37, 24, 210/30 R, 37 R, 38 R, 252, 257 M, 258, 259, 294, 321 A, 321 R, 322, 335, 433 M, 638

[56] References Cited

U.S. PATENT DOCUMENTS

| | | | |
|---|---|---|---|
| 3,639,231 | 2/1972 | Bresler | 210/30 R |
| 3,747,763 | 7/1973 | Kain | 210/257 M |
| 3,776,842 | 12/1973 | Grimme, Jr. | 210/254 X |

Primary Examiner—William F. Smith
Assistant Examiner—Ferris H. Lander
Attorney, Agent, or Firm—Dressler, Goldsmith, Shore, Sutker & Milnamow, Ltd.

[57] ABSTRACT

Water softened by ion exchange is pumped through a reverse osmosis material. The water treated by reverse osmosis may be stored under pressure and the reverse osmosis waste stream is recycled through the ion exchanger. The stored volume of water treated by reverse osmosis is approximately equal to or less than the volume of water that can be stored in the ion exchanger.

8 Claims, 1 Drawing Figure

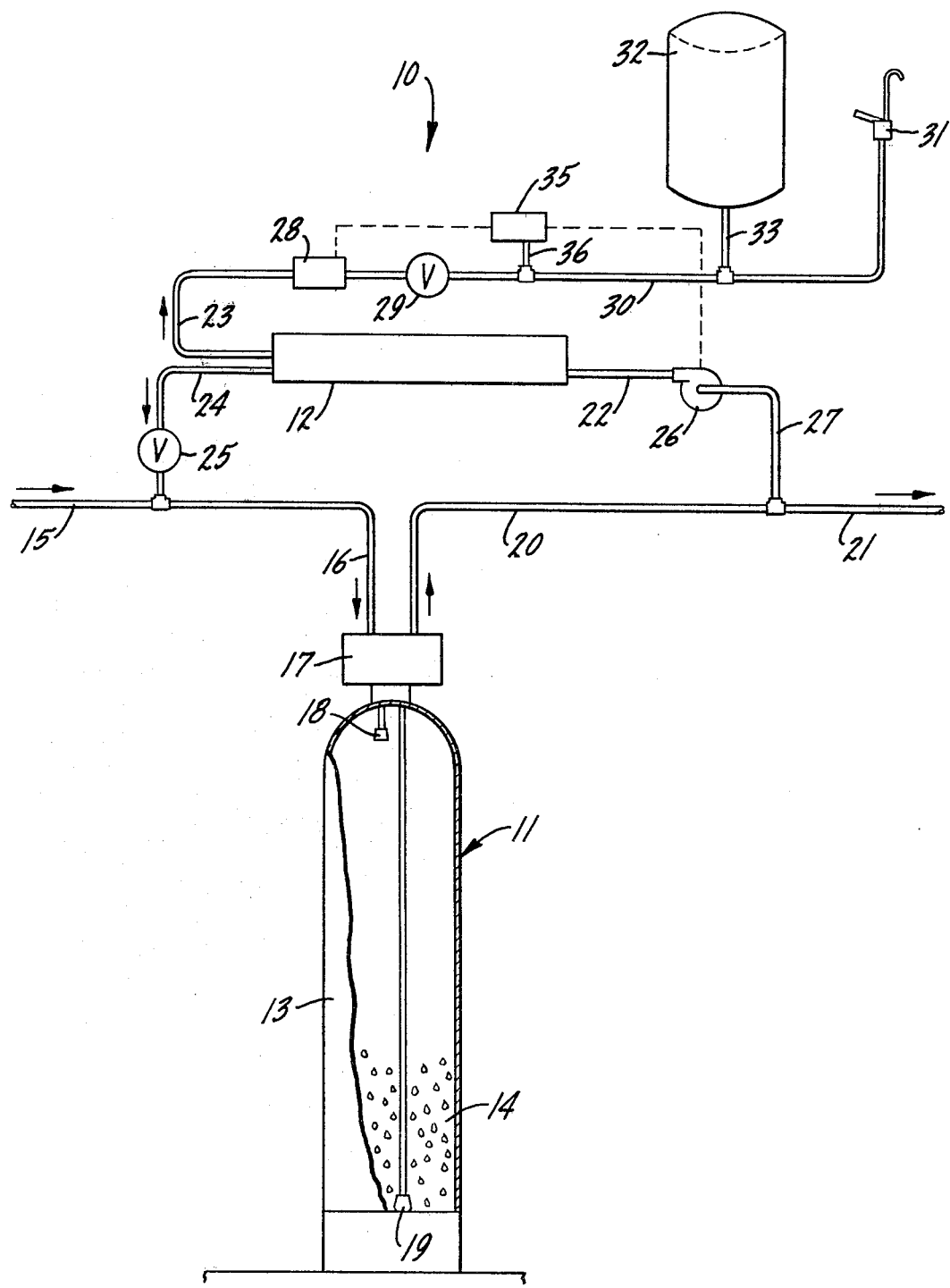

METHOD AND APPARATUS FOR TREATING WATER

BACKGROUND OF THE INVENTION

This invention relates to the treatment of water, and more particularly to the production of potable water by reverse osmosis after hard water has been softened by ion exchange. The softening of hard water by ion exchange results from the replacing of magnesium and calcium ions in the hard water by sodium ions from an ion exchange material. Water which has over about three grains of hardness is not considered soft and water having a total dissolved solids content over about 500 parts per million is undesirable for potable use.

Although hard water can be completely softened by ion exchange, the amount of dissolved solids in the soft water is essentially the same as that in the hard water. Thus, when the total dissolved solids in the hard water exceeds the 500 p.p.m. limit considered desirable for potable use, mere softening by ion exchange will not render the water potable. Treatment of water by reverse osmosis ordinarily removes about ninety percent of the total dissolved solids in the water, and thus is capable of producing potable water. However, treatment by reverse osmosis results in a stream of waste water having a higher concentration of dissolved solids than the water being treated. The waste stream is ordinarily discarded as useless, or it may be employed for a low importance use such as watering lawns. Also, the need for a reverse osmosis system to operate continuously for long periods has hindered integration with other types of water treatment.

OBJECTIVES OF THE INVENTION

Accordingly, it is an object of this invention to provide improved methods and apparatus for treating water.

Another object is to produce soft water and water with low total dissolved solids content by integrating reverse osmosis and ion exchange.

Another object is to eliminate the need to discard or dispose of the waste stream from a reverse osmosis system.

Another object is to enable water to be treated for storage by reverse osmosis with no resulting waste of water.

Another object is to turn water that is too hard to be potable into potable water and soft water by methods and apparatus that do not result in a sustained flow of waste water that must be disposed of.

Another object is to recycle reverse osmosis waste water that has been diluted during treatment by ion exchange.

Another object is to integrate low volume reverse osmosis water treatment into high volume ion exchange water treatment without wasting water.

Another object is to recycle diluted reverse osmosis waste water through an ion exchanger.

Another object is to provide a self-purging reverse osmosis water treatment operation that removes dissolved solids from the surface of the reverse osmosis material.

Another object is to provide a reverse osmosis water treatment system for the home that produces no waste water and is not totally dependent on other uses of water in such home.

Another object is to recycle reverse osmosis waste water through an ion exchanger in a way which limits the total dissolved solids concentration of such waste water as received by the ion exchanger to a maximum of about twice that of the untreated or raw water.

Another object is to provide an integrated reverse osmosis—ion exchange water treatment system for the home which is durable, relatively inexpensive, easy to maintain, and which does not possess defects found in similar systems.

Other objects and advantages of the invention will be found in the specification and claims, and the scope of the invention will be pointed out in the claims.

DESCRIPTION OF THE DRAWING

The FIGURE is a partially cross sectional schematic representation of a water treatment system in accord with this invention.

DESCRIPTION OF THE INVENTION

In the drawing a system 10 integrates a conventional water softening apparatus 11, and conventional reverse osmosis apparatus or module 12 in a way which provides a home with soft water and potable water low in total dissolved solids. Apparatus 11 includes a pressure tank 13 containing a bed 14 of cation exchange resin particles. A pressurized source of hard water feeds through line 15 into the hard water inlet conduit 16 of a conventional home water softener's multicycle electrically operated automatic control valve 17. Hard water flows into a perforated top distributor 18, through bed 14 where it is softened, and then into a perforated bottom collector 19 which is connected through valve 17 to a soft water outlet conduit 20 and a soft water supply line 21 for the home. Water softening apparatus 11 would include other conventional components such as a tank of regeneration liquid (not illustrated).

Reverse osmosis apparatus 12 may include any type of semi-permeable osmotic material in a suitable housing. Preferably a standard commercially obtainable module made from a cellulose acetate sheet membrane spirally rolled with a spacing material in hollow tube, such as Roga module No. 4800 or Desalinization Systems module No. F58, may be employed. Such a module has a feed water inlet 22, a potable water outlet 23 and a waste water or concentrate outlet 24. Outlet 24 is connected to hard water supply line 15 and inlet 16 through a check valve 25 that protects the osmotic material from pressure surges of the source of hard water.

Conventional electrically operated pump means 26 has its low pressure or input side connected by a line 27 to soft water supply line 21. The high pressure or output side of pump 26 is connected to feed water inlet 22 for circulating water through the osmotic material. Reverse osmosis apparatus 12 should operate at a relatively low pressure (e.g. 30–80 p.s.i.). The volume output of pump 26 (e.g. ten gallons per hour) should be sufficient to remove or prevent solids from collecting on the surface of the reverse osmosis material in module 12. It has been found that when pump 26 passes at least about two gallons per hour of soft water through module 12 for each square foot of osmotic material, solids are purged from the surface of the osmotic material. Preferably the output volume from pump 26 should be in the range of about two to five gallons per hour per square foot of osmotic material. These soft water flow rates through module 12 result in a relatively low ratio of treated water to concentrated waste water (e.g. 1 to 120), and thus the total dissolved solids concentration is only slightly increased in the waste stream recycled through outlet 24 back to water softener inlet 16.

The potable water from outlet 23 is both soft and low in total dissolved solids as a result of its passage through both ion exchange bed 14 and the reverse osmosis material in module 12. This treated water passes through an electrically operated solenoid valve 28 and a check valve 29 to a supply line 30 leading to a potable water tap 31 that may be located at the kitchen sink of a home. A conventional water storage accumulator tank 32 is connected to supply line 30 by an open line 33. The volume of potable water storage capacity in tank 32 should be approximately equal to or less than the volume of water that can be stored in resin tank 13 (e.g. 1½–5 gallons), but the water storage volume of tank 32 should not be less than about 10% of the water storage capacity of tank 13. Means 35, such as a pressure switch connected to accumulator 32 by lines 36 and 30, controls the operation of pump 26 and valve 28 through conventional electrical circuitry. Valve 28 is closed and pump 26 is shut off by opening of switch 35 when a predetermined volume of treated water is stored in accumulator 32, as indicated by the resulting pressure in line 36. When the treated water supply stored in accumulator 32 falls below some predetermined volume, as indicated by a lower pressure in line 36, switch 35 closes and causes the control circuitry to start pump 26 to open valve 28, so that water will flow through reverse osmosis module 12 into accumulator 32 until the needed potable water supply is replenished. A supply of soft water is continuously available for reverse osmosis treatment through line 27, so it does not matter whether soft water is being supplied to the home through line 21 when pump 26 is operating.

The waste water leaving module 12 is continuously pumped through line 24 back into the water softener inlet 16 even if no water is being supplied to the home through line 21. There is always less water being recycled through line 24 to inlet 16 than is being taken out through line 27 because some treated water always leaves this loop through outlet 23. The recycled waste stream from line 24 is diluted substantially by the hard water in line 15 and tank 13. When the storage volume of accumulator 32 and the storage volume of tank 13 are approximately equal, the maximum possible increase in the total dissolved solids concentration of the recycled water will be less than about twice that of the hard water from the original source, even though no water is flowing to the home through line 21, and when the storage volume of accumulator 32 is less than that of tank 13, the maximum possible increase in total dissolved solids concentration will be even less than twice. Thus resin tank 13 provides means for storing and diluting reverse osmosis waste water before it is recycled to module 12.

Control valve 17 isolates bed 14 of ion exchange particles during the regeneration, backwash, and rinse cycles of apparatus 11; these cycles are ordinarily timed to occur during the middle of the night when the demand for soft water in a home is nil. When bed 14 is thus isolated, hard water inlet 16 is connected through valve 17 directly to outlet 20. Thus if the supply of potable water in accumulator 32 should fall to a level which actuates pump 26, hard water will be supplied to reverse osmosis module 12 for purification into potable water while apparatus 11 is not producing soft water. Since the regeneration, backwash, and rinse cycles usually prevent production of soft water for only about one to two hours, any increase in hardness caused by recycling of the waste water from module 12 during such time will not be sufficient to have adverse effects.

It has thus been shown that by the practice of this invention, an ion exchanger can be integrated with reverse osmosis so as to produce both potable water and soft water from high solids content hard water without resulting in reverse osmosis waste water that must be discarded or put to low priority use. Each of the ion exchange and the reverse osmosis processes operate independently of the demand on the other for treated water. This lowers cost and simplifies the total system and its maintenance requirements while eliminating or minimizing the waste water.

While the present invention has been described with reference to a particular embodiment, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. The method of treating hard water so as to produce a first supply of softened water that is relatively high in dissolved solids and a second supply of potable water that is low in dissolved solids, comprising the steps of:
    (a) passing all of the hard water through an ion exchanger so as to produce a supply of soft water relatively high in dissolved solids;
    (b) passing some of the soft water that has passed through said ion exchanger through a reverse osmosis material so as to produce a supply of potable water low in dissolved solids and a waste water;
    (c) mixing all of said waste water with said hard water so as to dilute said waste water;
    (d) passing the mixture of said waste water and said hard water through said ion exchanger; and
    (e) storing downstream from said reverse osmosis material a volume of said potable water that is approximately equal to or less than the volume of water that can be stored in said ion exchanger.

2. The invention defined in claim 1, wherein the water coming from said ion exchanger is pumped to said osmotic material at a rate of at least about two gallons per hour per square foot of osmotic material.

3. The method of producing a first supply of soft water relatively high in dissolved solids and a second supply of potable water low in dissolved solids from hard water having a total dissolved solids content above about 500 parts per million comprising:
    (a) softening all of the hard water by passing it through an ion exchanger having a hard water inlet and a soft water outlet, whereby a supply of soft water relatively high in dissolved solids is produced at said soft water outlet;
    (b) pumping some of the softened water from said soft water supply through a reverse osmosis material so as to produce a supply of potable water low in dissolved solids and a waste water;
    (c) storing under pressure down stream from said reverse osmosis material a volume of said potable water approximately equal to or less than the storage volume capacity of said ion exchanger;

(d) mixing all of said waste water with said hard water so as to dilute said waste water; and (e) returning the mixture of said waste water and hard water to said hard water inlet of said ion exchanger for softening by-passage therethrough.

4. Apparatus for producing a first supply of soft water relatively high in dissolved solids and a second supply of potable water low in dissolved solids from hard water comprising:

(a) a hard water feed line and a soft water supply line;

(b) ion exchange water softening apparatus having a hard water inlet connected to said hard water feed line and an outlet for soft water relatively high in dissolved solids connected to said soft water supply line;

(c) reverse osmosis apparatus having a feed water inlet, an outlet supplying potable water low in dissolved solids, and a waste water outlet connected to said hard water feed line upstream from said hard water inlet of said water softening apparatus;

(d) pump means having its low pressure side connected to said soft water supply line downstream from said soft water outlet and its high pressure side connected to said feed water inlet of said reverse osmosis apparatus; and (e) means connected to said potable water supply outlet for storing a supply of potable water that has been treated by both said water softening apparatus and said reverse osmosis apparatus, the potable water storage volume capacity of said potable water storage means being approximately equal to or less than the water storage volume of said water softening apparatus.

5. The invention defined in claim 4, further comprising means for controlling the operation of said pump means in response to the amount of potable water in said potable water storage means.

6. The invention defined in claim 4, wherein the potable water storage volume capacity of said potable water storage means is not less than about 10% of the water storage volume of said water softening apparatus.

7. Apparatus for producing a first supply of soft water relatively high in dissolved solids and a second supply of potable water low in dissolved solids from hard water having a total dissolved solids content above about 500 parts per million comprising:

(a) a hard water feed line and a soft water supply line;

(b) ion exchange water softening apparatus including a resin tank having a hard water inlet connected to said hard water feed line and an outlet for soft water relatively high in dissolved solids connected to said soft water supply line; and (c) a reverse osmosis module having a feed water inlet, an outlet supplying potable water low in dissolved solids, and a waste water outlet connected to said hard water feed line upstream from said hard water inlet;

(d) a pump having its low pressure side connected to said soft water supply line downstream from said soft water outlet and its high pressure side connected to said feed water inlet of said reverse osmosis apparatus;

(e) a potable water accumulator connected to said potable water supply outlet for storing a pressurized supply of potable water low in dissolved solids that has been treated by both said water softening apparatus and said reverse osmosis apparatus, the potable water storage volume of said potable water accumulator being approximately equal to or less than the volume of water that can be stored in said resin tank; and (f) means for controlling the operation of said pump means in response to the amount of potable water in said accumulator.

8. The invention defined in claim 7, wherein said pump passes at least about two gallons of soft water per hour through said module for each square foot of osmotic material in said module.

* * * * *